United States Patent
Smith, Jr.

[15] 3,655,332
[45] Apr. 11, 1972

[54] PROCESS FOR PREPARING LITHIUM COMPOUNDS OF THE FORMULA LiMF$_6$ WHEREIN M IS ARSENIC OR ANTIMONY

[72] Inventor: William Novis Smith, Jr., Exton, Pa.
[73] Assignee: Foote Mineral Company, Exton, Pa.
[22] Filed: June 15, 1970
[21] Appl. No.: 46,543

[52] U.S. Cl................................................23/88, 23/59
[51] Int. Cl................C01d 11/02, C01b 27/00, C01b 29/00
[58] Field of Search...............................................23/88, 59

[56] References Cited

UNITED STATES PATENTS 3,018,162   1/1962   Halbedel et al...........................23/59

OTHER PUBLICATIONS

J. H. Simons' book " Fluorine Chemistry," 1954 Ed., Vol. 2, pages 19 and 20. Academic Press Inc., New York, N. Y.
AEC- tr- 3927, Part I, pages 288, 294, 300, 301, by I. G. Ryss, Moscow, 1956.

Primary Examiner—Edward Stern
Attorney—Howson and Howson

[57] ABSTRACT

Lithium compounds of the formula LiMF$_6$ wherein M is arsenic or antimony are prepared by a metathesis reaction in an inert organic solvent between lithium tetrafluoroborate and an alkali metal compound of the formula ZMF$_6$, wherein Z is potassium or sodium and M is as defined above.

8 Claims, No Drawings

PROCESS FOR PREPARING LITHIUM COMPOUNDS OF THE FORMULA LIMF WHEREIN M IS ARSENIC OR ANTIMONY

BACKGROUND OF THE INVENTION

1. Field of Invention

This invention relates to a process for preparing lithium compounds of the formula $LiMF_6$ wherein M is antimony or arsenic.

2. Prior Art

Alkali metal hexafluoroarsenates have been prepared by reacting alkali metal fluorides with arsenic pentoxide in anhydrous liquid hydrofluoric acid. Similarly, alkali metal hexafluoroantimonates have been prepared by reacting alkalimetal fluorides with antimony pentafluoride in anhydrous liquid hydrofluoric acid. These procedures are undesirable because of use of anhydrous hydrofluoric acid.

U.S. Pat. No. 3,359,241 discloses that certain metal hexafluoroantimonates are useful catalysts in the preparation of high molecular weight polyesters. U.S. Pat. No. 3,380,803 describes a process for preparing alkali metal and alkaline earth metal hexafluorophosphates in which elemental phosphorous and an alkali metal or alkaline earth metal fluoride are reacted in the presence of hydrogen fluoride in a closed vessel at a temperature of about 200° C. under autogenous pressure.

Applicant's copending U.S. Pat. application Ser. No. 21,214, filed Mar. 19, 1970, describes a process for preparing lithium hexafluorophosphate in which lithium fluoride is reacted with phosphorous pentafluoride in an inert organic solvent without the requirement of high temperature and pressure.

It is the principal object of this invention to provide a process for the preparation of lithium compounds of the formula $LiMF_6$ wherein M is arsenic or antimony. It is a further object of this invention to provide a process for preparing the desired lithium compounds by a process which if efficient, produces a high yield of the desired product, and is simple and economical to operate.

SUMMARY OF THE INVENTION

The method of preparing lithium compounds of the formula $LiMF_6$ wherein M is arsenic or antimony according to this invention comprises reacting lithium tetrafluoroborate with a molecular equivalent of an alkali metal compound of the formula $ZMF_6$ wherein Z is potassium or sodium and M is arsenic or antimony, in solution in a lower alkyl ester of a lower aliphatic saturated monocarboxylic acid of the formula RCOOR', wherein R is H or an alkyl group containing from one to four carbon atoms and R' is an alkyl group containing from one to four carbon atoms.

DETAILED DESCRIPTION OF INVENTION

The reaction between the lithium tetrafluoroborate and the alkali metal hexafluoro compound to prepare the desired lithium compounds proceeds according to the equation:

$$LiBF_4 + ZMF_6 \rightarrow LiMF_6 + ZBF_4 \qquad (I)$$

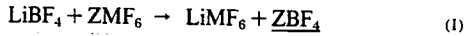

wherein Z is potassium or sodium and M is arsenic or antimony.

As can be seen from this equation, the process can be utilized to prepare two lithium compounds, lithium haxafluoroarsenate or lithium hexafluoroantimonate. In the production of lithium hexafluoroarsenate it is preferred to react potassium hexafluoroarsenate with lithium tetrafluoroborate; while in the production of lithium hexafluoroantimonate it is preferred to react sodium hexafluoroantimonate with lithium tetrafluoroborate.

The method of the present invention is carried out in a lower alkyl ester of a lower aliphatic saturated monocarboxylic acid of the formula RCOOR', wherein R can be H or an alkyl group containing from one to four carbon atoms and R' is an alkyl group containing from one to four carbon atoms. Suitable ester solvents include methyl formate, ethyl formate, methyl acetate, ethyl acetate, propyl acetate, butyl acetate, butyl propionate, butyl butyrate, and ethyl butyrate, methyl formate being the preferred solvent.

Lithium tetrafluoroborate is only slightly soluble in the ester solvent. However, the sodium or potassium hexafluoroarsenate and hexafluoroantimonate are relatively highly soluble therein and the by-product sodium or potassium tetrafluoroborate is essentially insoluble and precipitates. Hence the reaction goes essentially to completion with the desired product in solution and the only by-product is a readily separable solid. In general, therefore, the present process comprises simply mixing the lithium tetrafluoroborate and the sodium or potassium hexafluoroarsenate or hexafluoroantimonate in the stated ester solvent. The order of addition of the components, including ester solvent, is not critical, and the ester solvent may be associated with one or the other, or both, of the reactants at the time they are mixed. For example, a slurry of the lithium tetrafluoroborate may be formed in part or all of the ester solvent and the hexafluoroarsenate or hexafluoroantimonate may be mixed therewith as a solid or predissolved in the remainder of the ester solvent. The concentration of the reactants in the ester solvent will generally be equivalent to that providing a concentration of lithium hexafluoroarsenate or hexafluoroantimonate of at least 5 percent and preferably at least 30 percent.

The lithium tetrafluoroborate employed in the reaction can be prepared or procured and added as such, or, as is preferred in this process, it may be formed in situ in the ester solvent through a reaction between lithium fluoride and boron trifluoride which proceeds according to the following equation:

$$LiF + BF_3 \rightarrow LiBF_4 \qquad (II)$$

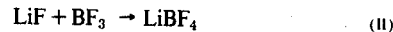

The lithium fluoride employed in this reaction is utilized in finely-divided form, that is, having a particle size of about minus 100 mesh. Lithium fluoride powder is preferred.

The boron trifluoride is reacted with the lithium fluoride simply by bubbling boron trifluoride gas into a slurry of lithium fluoride in the ester solvent, preferably with constant agitation, for a period of time sufficient for the reaction between the lithium fluoride and boron trifluoride to occur, about 0.5 hours being generally sufficient. The lithium fluoride reactant should be slurried in the ester solvent in a concentration of at least about 0.6 percent, preferably at least about 4 percent, by weight, based on the weight of the solution, for the reaction with boron trifluoride.

The equation (II) shows that the reactants, lithium fluoride and boron trifluoride, are reacted with each other on a stoichiometric basis of one mole to one mole; however, in the in situ formation of lithium tetrafluoroborate, an amount of one in situ formation of lithium tetrafluoroborate, an amount of one of the reactants in excess of the stoichiometric quantity may be utilized for good results. Thus, an amount of lithium fluoride up to about 10 percent, especially about 3 percent, in excess of the stoichiometric quantity required to form the lithium tetrafluoroborate may be employed.

The reaction between lithium fluoride and boron trifluoride proceeds at a temperature of from about $-20°$ C. to about 50° C., preferably from about 0° C. to about 5° C. The pressure conditions for the reaction are not critical, and may be subatmospheric, atmospheric or superatmospheric, depending upon the temperature utilized.

While it is preferred that the lithium tetrafluoroborate reactant be formed in situ in the reaction mixture, it is not essential that it be formed prior to the addition of the potassium hexafluoroarsenate or sodium hexafluoroantimonate. That is, the lithium fluoride and potassium hexafluoroarsenate or sodium hexafluoroantimonate could be present in the reaction solvent and the boron trifluoride gas bubbled into or passed over this mixture to form the lithium tetrafluoroborate. All that is essential is that the lithium fluoride and boron trifluoride be added to the reaction mixture to provide the lithium tetrafluoroborate in situ or that the lithium tetrafluoroborate be prepared and added to the reaction mixture as such.

The potassium hexafluoroarsenate or sodium hexafluoroantimonate are reacted with the lithium tetrafluoroborate on a stoichiometric basis of one mole to one mole as shown in Equation (I) by simply mixing the reactants together, preferably with the aid of continuous agitation, for a period of time sufficient for the metathesis reaction to occur, usually from about 10 hours to about 12 hours being sufficient. In practice some excess, up to about 2 percent excess, of the stoichiometric amount of the lithium tetrafluoroborate may be employed to aid completion of the reaction.

The reaction between lithium tetrafluoroborate and the potassium hexafluoroarsenate or sodium hexafluoroantimonate proceeds at a temperature of from about $-20°$ C. to about $80°$ C., preferably from about $0°$ C. to about $20°$ C. The pressure conditions for the reaction are not critical and may be sub-atmospheric, atmospheric or superatmospheric, depending on the temperature.

As is generally the case in reactions involving lithium compounds, it is preferred to carry out the reaction in an inert atmosphere; that is, under an atmosphere free of oxygen and water vapor such as is provided by an atmosphere of argon, nitrogen and other well known inert gases. Nitrogen is the preferred inert gas in this process.

The metathesis reaction between lithium tetrafluoroborate and the sodium or potassium hexafluoroarsenate or hexafluoroantimonate in the ester solvent results in the formation of a solution of lithium hexafluoroarsenate or lithium hexafluoroantimonate, respectively. The by-product sodium or potassium tetrafluoroborate precipitates and can be easily separated from the reaction mixture by any acceptable means such as by simple filtration procedures.

While not a critical part of this process, should the lithium hexafluoroarsenate or lithium hexafluoroantimonate products have undesired color qualities, the color can be easily removed by treating the product, in solution form, with decolorizing charcoal according to well known procedures.

If it is desired to have the product in solid form, this can be accomplished by heating the lithium hexafluoroarsenate or lithium hexafluoroantimonate solutions to a temperature of from about $30°$ to $60°$ C., preferably from about $50°$ to $55°$ C., under a vacuum of 0.01 mm. to 0.5 mm.Hg. until dry. This process provides solid, high purity lithium hexafluoroarsenate or lithium hexafluoroantimonate.

The lithium hexafluoroarsenate and hexafluoroantimonate produced by this process find use as polymerization catalysts in the preparation of high molecular weight polyesters and they are also useful as battery electrolytes.

This invention may be more fully illustrated by the following examples.

EXAMPLE 1

A three-neck round bottom flask equipped with a stirrer, thermometer and gas addition tube is purged with dry nitrogen followed by the addition of 106 g. of lithium fluoride and 680 ml. methyl formate. The slurry is stirred and cooled to maintain a temperature of $0°$ C. while 267 g. of boron trifluoride gas is added over a half hour period. The temperature of the slurry is permitted to rise to $15°$ C. and 848 g. of potassium hexafluoroarsenate, 98 percent pure, is then added. The resultant slurry is stirred for 42 hours and filtered. Thirteen hundred grams of filtrate are evaporated to 1,130 g. of solution which analyzes 2.05 percent lithium; 412 p.p.m. potassium; and 0.10 percent boron. The product solution is 56.6 percent, by weight, lithium hexafluoroarsenate for a yield of 90 percent.

EXAMPLE 2

Using the same apparatus as in Example 1, a filtered saturated solution of 205 g. of potassium hexafluoroarsenate in 435 ml. of methyl formate are added to the flask with 30 g. of lithium fluoride. The resultant slurry is cooled to $0-5°$ C. while 62.8 g. of boron trifluoride gas is added to the flask over a 5 hour period. The resulting slurry is stirred and permitted to warm to room temperature over a 16 hour period. The mixture is filtered and the filter cake is washed with one 20 ml. wash and one 10 ml. wash of methyl formate. The filtrate with washings weighs 512 g. while the damp filter cake weighs 146 g. The filtrate is evaporated to 342 g. and refiltered. The resulting filter cake weighs 0.5 g. The filtrate analyzes 1.82 percent lithium, 500 p.p.m. potassium, and 0.13 percent boron. The produce solution is 51.5 percent, by weight, lithium hexafluoroarsenate for a yield of 89 percent.

EXAMPLE 3

Using the apparatus of Example 1, 215 ml. of methyl formate and 30g of lithium fluoride are added to the flask. The resultant slurry is maintained at $0°-5°$ C. while 70 g. of boron trifluoride is added over a period of 1.1 hours. The reaction mixture is permitted to warm to $20°$ C. followed by the addition of 235 g. of 98 percent pure potassium hexafluoroarsenate. A slightly exothermic reaction between the potassium hexafluoroarsenate and the lithium tetrafluoroborate occurs while the reactants are agitated for 16 hours. The reaction mixture is filtered and the filter cake is washed with one 20 ml. rinse and one 10 ml. rinse of methyl formate. The filtrate, with washings, weighs 374 g. and analyzes 1.67 percent lithium, 0.08 percent boron and 0.116 percent potassium. The filter cake weighs 184 g. The product solution is 47 percent by weight, lithium hexafluoroarsenate for a yield of 85 percent.

EXAMPLE 4

Using the apparatus of Example 1, 15.3 g. of lithium fluoride and 143 ml. of methyl formate are added to the flask. The resultant slurry is maintained at $20°$ C. while 32.5 g. of boron trifluoride is added over a period of 3 hours. The mixture is maintained at $25°$ C. with the addition of 117.5 g. of sodium hexafluoroantimonate. The reaction slurry is stirred for 16 hours and filtered. The filtrate weighs 217 g. and contains 1.32 percent lithium, 0.39 percent sodium and 0.123 percent boron. The product solution is 46.5 percent, by weight, lithium hexafluoroantimonate for a yield of 92 percent.

What is claimed is:

1. A method for preparing lithium compounds of the formula $LiMF_6$ wherein M is arsenic or antimony which comprises reacting, in an inert atmosphere, about one mole of lithium tetrafluoroborate with about one mole of an alkali metal compound of the formula $ZMF_6$ wherein Z is potassium or sodium and M is arsenic or antimony in a lower alkyl ester of a lower aliphatic saturated monocarboxylic acid of the formula RCOOR', wherein R is H or an alkyl group containing from one to four carbon atoms and R' is an alkyl group containing from one to four carbon atoms and recovering said lithium compounds of the formula $LiMF_6$.

2. The method of claim 1 wherein the alkali metal compound is potassium hexafluoroarsenate and the lithium compound prepared is lithium hexafluoroarsenate.

3. The method of claim 1 wherein the alkali metal compound is sodium hexafluoroantimonate and the lithium compound prepared is lithium hexafluoroantimonate.

4. The method of claim 1 where the lithium tetrafluoroborate is prepared in situ by a reaction between lithium fluoride and boron trifluoride.

5. The method of claim 1 wherein the reaction is carried out at a temperature of from about $-20°$ C. to about $80°$ C.

6. The method of claim 5 wherein the reaction is carried out at a temperature of from about $0°$ C. to about $20°$ C.

7. The method of claim 1 wherein the solvent is methyl formate.

8. The method of claim 1 wherein the product is recovered in solid form by removing the by-product sodium or potassium tetrafluoroborate and evaporating the ester.

* * * * *

UNITED STATES PATENT OFFICE
CERTIFICATE OF CORRECTION

Patent No. 3,655,332      Dated April 11, 1972

Inventor(s) William Novis Smith, Jr.

It is certified that error appears in the above-identified patent and that said Letters Patent are hereby corrected as shown below:

Col. 1,             In the title "LiMF" should be --$LiMF_6$--
Col. 1, line 38,    "if" should be --is--
Col. 1, line 67,    "haxafluoroar-" should be --hexafluoroar--
Col. 2, line 57,    delete "of" (2nd occurrence)
Col. 2, line 58,    delete this line
Col. 4, line 16,    "produce" should be --product--

Signed and sealed this 8th day of August 1972.

(SEAL)
Attest:

EDWARD M. FLETCHER, JR.      ROBERT GOTTSCHALK
Attesting Officer            Commissioner of Patents